US 10,169,831 B2

(12) United States Patent
Wang (10) Patent No.: US 10,169,831 B2
(45) Date of Patent: *Jan. 1, 2019

(54) ESTABLISHING SOCIAL NETWORK SERVICE RELATIONSHIPS

(71) Applicant: Alibaba Group Holding Limited, Grand Cayman (KY)

(72) Inventor: Jiawen Wang, Hangzhou (CN)

(73) Assignee: Alibaba Group Holding Limited, George Town (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/242,184

(22) Filed: Aug. 19, 2016

(65) Prior Publication Data

US 2016/0358270 A1    Dec. 8, 2016

Related U.S. Application Data

(63) Continuation of application No. 13/262,746, filed as application No. PCT/US2011/045343 on Jul. 26, 2011, now Pat. No. 9,426,235.

(30) Foreign Application Priority Data

Jul. 26, 2010   (CN) .......................... 2010 1 0236246

(51) Int. Cl.
*G06F 15/16*        (2006.01)
*G06Q 50/00*       (2012.01)
(Continued)

(52) U.S. Cl.
CPC ............. *G06Q 50/01* (2013.01); *G06Q 10/00* (2013.01); *G06Q 10/10* (2013.01); *G06Q 20/10* (2013.01);
(Continued)

(58) Field of Classification Search
CPC ...... H04L 67/22; H04L 12/14; H04L 12/1467
(Continued)

(56) References Cited

U.S. PATENT DOCUMENTS 7,177,880 B2    2/2007  Ruvolo et al.
7,685,016 B2    3/2010  Flores et al.
(Continued)

FOREIGN PATENT DOCUMENTS

CN    101068151 A    11/2007
JP    2008102629     5/2008
(Continued)

OTHER PUBLICATIONS

Translated Chinese Office Action dated Apr. 3, 2014 for Chinese Patent Application Serial No. 201010236246.0, 6 pages.
(Continued)

*Primary Examiner* — Wing F Chan
*Assistant Examiner* — Andrew Woo
(74) *Attorney, Agent, or Firm* — Lee & Hayes, PLLC (57) ABSTRACT

This present disclosure discloses techniques for establishing social network service (SNS) relationship. According to the techniques, online payment information of the first user and/or the second user are obtained from the database of the online transaction platform. Using this online payment information, it is determined whether the first user and the second user know each other. If they do, a message to establish an SNS relationship establishment is sent to the first user. The message contains personal information of the second user and allows the first user to decide whether to establish the relationship. The techniques therefore improve security and success rates in establishing SNS relationships.

19 Claims, 4 Drawing Sheets

(51) Int. Cl.
*G06Q 10/00* (2012.01)
*H04L 29/08* (2006.01)
*G06Q 10/10* (2012.01)
*G06Q 20/10* (2012.01)
*H04L 12/58* (2006.01)
*H04L 29/12* (2006.01)

(52) U.S. Cl.
CPC .............. *H04L 51/04* (2013.01); *H04L 67/22* (2013.01); *H04L 67/306* (2013.01); *H04L 61/1594* (2013.01)

(58) Field of Classification Search
USPC ......................................................... 709/204
See application file for complete search history.

(56) References Cited

U.S. PATENT DOCUMENTS

| | | | |
|---|---|---|---|
| 8,010,602 B2 | 8/2011 | Shen et al. | |
| 2005/0198131 A1 | 9/2005 | Appelman et al. | |
| 2006/0281555 A1 | 12/2006 | Kellerman et al. | |
| 2008/0001634 A1 | 1/2008 | Arabi et al. | |
| 2008/0071634 A1* | 3/2008 | Rampell ................. | G06Q 30/08 705/26.3 |
| 2008/0098313 A1 | 4/2008 | Pollack | |
| 2008/0243607 A1 | 10/2008 | Rohan et al. | |
| 2009/0122065 A1 | 5/2009 | Patil et al. | |
| 2009/0125543 A1 | 5/2009 | Patil et al. | |
| 2009/0144070 A1 | 6/2009 | Psota et al. | |
| 2009/0144213 A1 | 6/2009 | Patil et al. | |
| 2009/0150254 A1 | 6/2009 | Dickelman | |
| 2009/0198562 A1 | 8/2009 | Wiesinger et al. | |
| 2009/0234680 A1 | 9/2009 | NEewton | |
| 2009/0254456 A1 | 10/2009 | Sarbaev et al. | |
| 2009/0319288 A1 | 12/2009 | Slaney et al. | |
| 2009/0319914 A1 | 12/2009 | Roseway et al. | |
| 2010/0042680 A1 | 2/2010 | Czyzewicz et al. | |
| 2010/0063993 A1 | 3/2010 | Higgins et al. | |
| 2010/0177938 A1 | 7/2010 | Martinez et al. | |
| 2010/0312696 A1* | 12/2010 | Sinha ................... | G06Q 20/102 705/40 |
| 2011/0213707 A1* | 9/2011 | Jackson ................. | G06Q 20/10 705/44 |
| 2011/0218846 A1 | 9/2011 | Fieldman et al. | |

FOREIGN PATENT DOCUMENTS

| | | |
|---|---|---|
| JP | 2008242639 | 10/2008 |
| JP | 2009169977 | 7/2009 |

OTHER PUBLICATIONS

Office action from Chinese patent application No. 201010236246.0, dated Apr. 3, 2014, which corresponds to U.S. Appl. No. 13/262,746.
The Office Action (pp. 2-4) from the Chinese Patent Office for Application No. 201010236246.0 dated Nov. 3, 2014, a counterpart foreign application of U.S. Appl. No. 13/262,746, 9 pages.
The Chinese Office Action dated Dec. 24, 2012 for Chinese patent application No. 201010236246.0, a counterpart foreign application of U.S. Appl. No. 13/262,746, 3 pages.
Translation of Chinese Office Action for CN101068151a dated Sep. 3, 2013, 6 pages.
The Chinese Office Action dated Sep. 13, 2013 for Chinese patent application No. 2010102362460 a counterpart foreign application of U.S. Appl. No. 13/262,746, 3 pages.
Decision of Appeal dated Sep. 16, 2015 in Chinese Application No. 201010236246.0.
The Extended European Search Report dated Mar. 30, 2016 for European patent application No. 11815066.3, 7 pages.
The Japanese Office Action dated Jun. 2, 2015 for Japanese patent application No. 2013-521903, a counterpart foreign application of U.S. Appl. No. 13/262,746, 5 pages.
Office Action for U.S. Appl. No. 13/262,746, dated Dec. 15, 2014, Jiawen Wang, "Establishing Social Network Service Relationships", 32 pages.
Office Action for U.S. Appl. No. 13/262,746, dated Dec. 19, 2013, Jiawen Wang, "Establishing Social Network Service Relationships", 27 pages.
Office action for U.S. Appl. No. 13/262,746 dated Dec. 3, 2015, Wang, "Establishing Social Network Service Relationships", 21 pages.
Final Office Action for U.S. Appl. No. 13/262,746, dated May 23, 2014, Jiawen Wang, "Establishing Social Network Service Relationships", 26 pages.
Final Office Action for U.S. Appl. No. 13/262,746 dated Jun. 11, 2015, Jiawen Wang, "Establishing Social Network Service Relationships", 22 pages.
Dike action for U.S. Appl. No. 13/262,746, dated Jul. 19, 2013, Wang, "Establishing Social Network Service Relationships", 24 pages.
The PCT Search Report and written opinion dated Jan. 4, 2012 for PCT application No. PCT/US11/45343, 10 pgs.
The Japanese Office Action mailed Apr. 25, 2017 for Japanese Patent Application No. 2016-071166, a counterpart foreign application of U.S. Pat. No. 9,426,235, 6 pages.

* cited by examiner

ESTABLISHING SOCIAL NETWORK SERVICE RELATIONSHIPS

CROSS REFERENCE TO RELATED PATENT APPLICATIONS

This application is a continuation of U.S. application Ser. No. 13/262,746, filed Oct. 3, 2011, which is a national stage application of an international patent application PCT/US11/45343, filed Jul. 26, 2011, which claims priority from Chinese Patent Application No. 201010236246.0 filed on Jul. 26, 2010, entitled "METHOD AND DEVICE FOR ESTABLISHING SOCIAL NETWORK SERVICES RELATIONSHIP," which applications are hereby incorporated in their entirety by reference.

TECHNICAL FIELD

The present disclosure relates to the field of network technology and, more specifically, to establishing social network service relationships.

BACKGROUND

The social network service (SNS) is a technical application framework under the Web 2.0 system. Its goal is to help people establish a social network. Through the establishment of the social network by social friend relationships, friends can share human resources with each other, and resolve particular application problems during the establishment process. The SNS can help to achieve sharing of personal data processing, personal social relationships management, and reliable business information, to securely share personal information and knowledge with trustworthy people, and to utilize the trusted relationships to expand the social network to achieve a more valuable communication and collaboration.

The SNS includes online users and their relationship networks, and can achieve accurate search and effective transmission of information, thereby satisfying different needs of the users and enterprises. The SNS community is a social network system that is built based on the SNS theories. The SNS contains massive amounts of users and relationship data. Thus, there is a basic problem to resolve: how to find valuable and interesting information from the massive amounts of social network data. Apparently, the users and enterprises are not interested in all of the massive amounts of users and relationship data in the social networks, and are only interested in a relationship circle of specific targets.

In the SNS community, users often have to connect with many unfamiliar people and become friends with them, in order to establish SNS relationships. Generally, the users can directly add a friend according to the registered email information; or they can also use email addresses of contacts in the address book of email, instant messaging, and other client messaging services to match corresponding friends.

In the process of implementing the present disclosure, the inventors discovered that the current techniques have at least the following problems. When using email addresses in the address book to match friends, the current techniques rely on the user's participation and corresponding inputs. For example, the user has to enter the email address, user name or password to log in the instant messaging software to find corresponding friends by searching the email address, user name, user ID, nickname, and so forth. Such techniques cannot realize fully automated matching, and may even cause password leakage during the matching. In addition, the above-mentioned process depends on the open interface port and data format of the email and instant messaging service. Once there is a change in the interface and data format, the matching function will not work. On the other hand, the matched friends are all contacts at the network, which is quite limited. People who are not contacts in the network but the user knows in the real world cannot be matched. Further, contacts in the email or instant messaging are not necessarily SNS users, thus the successful rate in matching friends is very low.

SUMMARY

The exemplary embodiments of the present disclosure provide techniques for establishing SNS relationships in ways that increase security and achieve higher success rates. Generally, the techniques employ use of online payment information to discover whether relationships may exist between users, and if so, allow the users to establish a SNS relationship.

According to one process implementation, online payment information of a first user and/or a second user is obtained from a database of an online transaction platform. The online payment information may include any number of content items, including direct payment record information, substitute payment record information, and joint payment record information. It is determined whether the first user and the second user know each other based on the online payment information. If they know each other, a message to establish a SNS relationship is sent to the first user. The message includes personal information of the second user.

There are many different ways to determine whether the first and second users know each other based on the online payment information. In some implementations, the determination is made by examining when there exists a direct payment record between the first user and the second user based on the direct payment record information. If such a record exists, the first user and second user are deemed to know each other.

In another implementation, the first user and the second user are deemed to know each other when there exists a substitute payment record between the first user and the second user based on the substitute payment record information.

In some implementations, the determination is made by examining whether there exists a joint payment record between the first user and the second user based on the joint payment record information. If such a record exists, the first user and the second user are deemed to know each other.

In some implementations, the determination whether the first user and the second user know each other based on the online payment information may be accomplished in a number of ways through various combinations of online payment information types. For example, when there exists the direct payment record between the first user and the second user based on the direct payment record information, and there does not exist a transaction record between the first user and the second user, the first user and the second user are deemed to know each other. Alternatively, when there exists the substitute payment record between the first user and the second user based on the substitute payment record information, even though there does not exist the direct payment record between the first user and the second user based on the direct payment record information, the first user and the second user are deemed to know each other. Alternatively, when there exists the joint payment record between the first user and the second user based on the joint payment record information, even though there does not exist the direct payment record and the substitute payment record between the first user and the second user, the first user and the second user are deemed to know each other.

In some implementations, after the determination that the first user and the second user know each other based on the online payment information, the message to establish the SNS relationship is sent to the second user. The message to establish the SNS relationship includes personal information of the first user.

The exemplary embodiments of the present disclosure also provide a device for establishing SNS relationship. This device may include a retrieval module that retrieves the online payment information of the first user and/or the second user from the database of the online transaction platform. In some implementations, the retrieval module is used to retrieve at least one of the following items of contents relating to the first user and/or the second user: the direct payment record information, the substitute payment record information, and the joint payment record information.

The device may also include a processing module that uses the online payment information to determine that the first user and second user knows each other. The processing module may make this determination in a number of ways. For example, when the processing module determines that there exists the direct payment record between the first user and the second user based on the direct payment record information, and there does not exist a transaction record between the first user and the second user, the first user and the second user are deemed to know each other. Alternatively, when the processing module determines that there exists the substitute payment record between the first user and the second user based on the substitute payment record information, even though there does not exist the direct payment record between the first user and the second user based on the direct payment record information, the first user and the second user are deemed to know each other. Alternatively, when the processing module determines that there exists the joint payment record between the first user and the second user based on the joint payment record information, even though there does not exist the direct payment record and the substitute payment record between the first user and the second user, the first user and the second user are deemed to know each other.

Further, the device may also include a transmission module that transmits the message to establish SNS relationship to the first user, wherein the message to establish the SNS relationship includes personal information of the second user.

The present disclosure includes at least following advantages. When determining, based on the online payment information, that two users know each other, the techniques send to one user the message to establish SNS relationship that contains the personal information of the other user, in order to establish SNS relationship. In the process, the techniques may determine that the two users who know each other are both members of the SNS community, thereby increasing the successful rate of establishing SNS relationship. In addition, the above confirmation process is based on the platform and database of SNS without reliance on any third party, thereby increasing the stability and security of the whole operations. Further, in at least some embodiments, the techniques do not require the users to enter any information, thereby preventing leakage of the users information. The techniques thus also reduce transmission of messages to establish SNS relationship, avoid generation of massive amount of useless messages to establish SNS relationship due to errors of determination, and reduce the burden of the device that sends out the messages to establish SNS relationship. Certainly, it is not necessary for any embodiment of the present disclosure to achieve all of the advantages at the same time.

DESCRIPTION OF THE DRAWINGS

In order to aid the understanding of the technical scheme of the exemplary embodiments of the present disclosure, accompanying figures are provided and briefly described below. The following figures represent only a few exemplary embodiments instead of all embodiments of the present disclosure. Any other embodiments obtained by one of ordinary skill in the art based on these accompanying figures also fall under the protection scope of the present disclosure.

DETAILED DESCRIPTION

The present disclosure, by reference to the figures in the drawings, describes techniques for establishing social network services relationships. The figures show some embodiments, but not all embodiments of the present disclosure, as will be appreciated by people of ordinary skill in the art. Generally, the techniques employ use of online payment information to discover whether relationships may exist between users, and if so, allow the users to establish a SNS relationship.

More particularly, the present disclosure describes obtaining online payment information of a first user and/or a second user, and sending a message to establish a SNS relationship to the first user after determining that the first user and the second user know each other based on the online payment information. The message to establish the SNS relationship contains the personal information of the second user. The online payment information may include, for example, direct payment record information, substitute payment record information, and joint payment record information. In some implementations, the online payment information of the first user and/or the second user may be stored in the database of the same online transaction platform, or in different databases of related different online transaction platform.

First Example Embodiment

Figure 1:
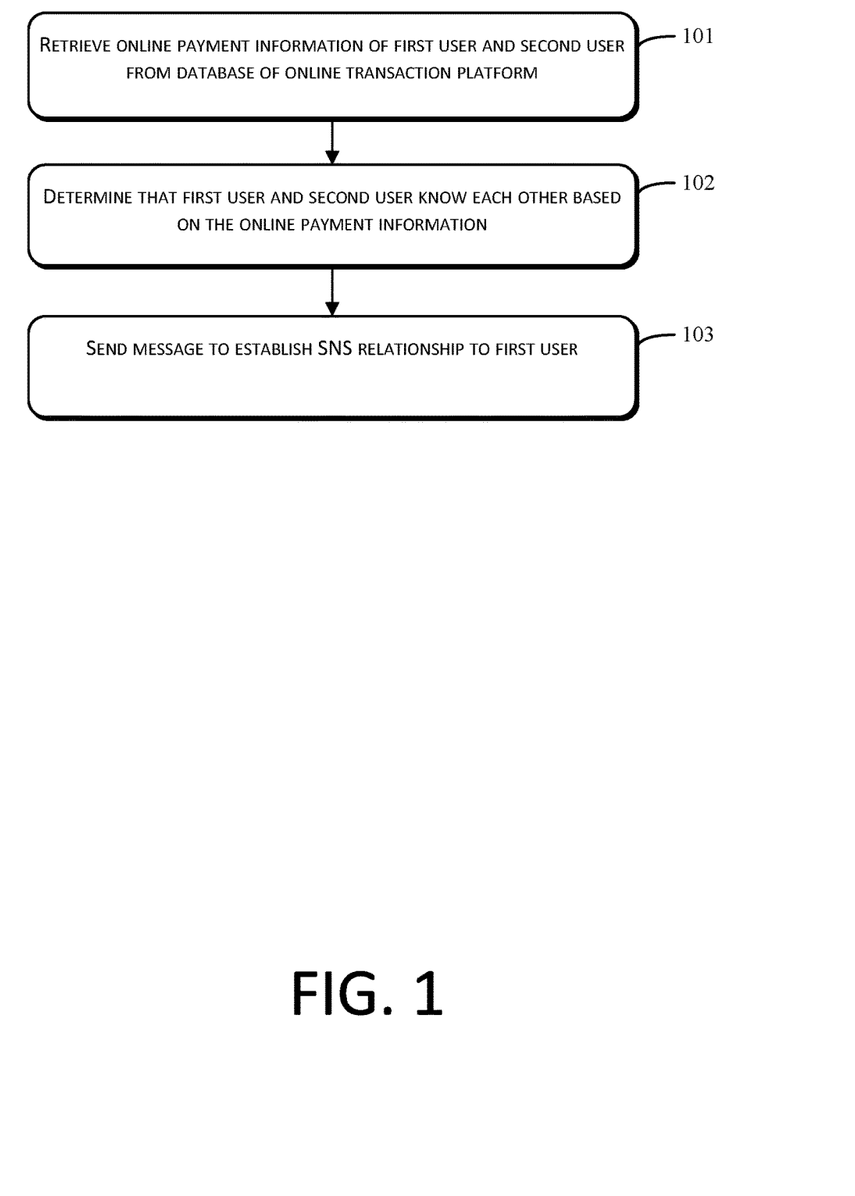
FIG. 1 shows an exemplary flow diagram of a method for establishing SNS relationship under a first example embodiment of the present disclosure.

FIG. 1 shows a first example process for establishing SNS relationship. The process is shown as a series of blocks that represent operations. These operations may be performed programmatically, for example, in software and/or hardware.

At 101, online payment information of the first user and/or the second user is retrieved from the database of an online transaction platform.

The online payment information may include at least one of the following: direct payment record information, substitute payment record information, and joint payment record information. For example, the techniques may retrieve the online payment information of the first user and/or the second user from the database of a particular online transaction platform (such as Taobao™ and/or Alipay™ which are both operated by Alibaba Group).

At 102, a determination is made as to whether the first user and the second user know each other based on the online payment information.

This may be accomplished in a number of ways. For instance, the techniques may determine that the first user and second user know each other when there exists a direct payment record between the first user and the second user, and there is no transaction record between the first user and the second user. There may be several conditions that justify the direct payment record between the first user and the second user. Such conditions include that the first user directly pays the second user, and/or that the second user directly pays the first user.

In another implementation, the techniques may determine that the first user and second user know each other when there exists a substitute payment record between the first user and the second user. There may be several conditions that justify the substitute payment record between the first user and the second user. Such conditions include that the first user pays the substitute payment for the second user, and/or that the second user pays the substitute payment for the first user.

In yet another example, the techniques may determine that the first user and second user know each other when there exists a joint payment record between the first user and the second user. There may be several conditions that justify the joint payment record between the first user and the second user. Such conditions include that the first user and the second user jointly pay a third party.

At 103, a message to establish SNS relationship is sent to the first user.

The message to establish the SNS relationship may contain personal information of the second user, and be used to request of the first user whether to establish SNS relationship with the second user. Once receiving the confirmation message from the first user, the techniques may establish the SNS relationship between the first user and second user.

Specifically, in the process of establishing the SNS relationship between the first user and the second user, the personal information of the first user and the second user (such as user ID) may be stored in a database, and the SNS relationship between the first user and the second user may be recorded in the database.

After the first user and the second user has established the SNS relationship, the first user may obtain the personal information of the second user by searching the database, and, based on the personal information of the second user, communicate with the second user, or perform other operations, such as removing the SNS relationship with the second user or checking characteristics information of the second user.

The present disclosure includes at least following advantages. When determining, based on the online payment information, that two users know each other, the techniques send to one user the message to establish SNS relationship that contains the personal information of the other user, in order to establish SNS relationship. In the process, the techniques may determine that the two users who know each other are both members of the SNS community, thereby increasing the success rate of establishing SNS relationship. In addition, the above confirmation process is based on the platform and database of SNS without reliance on any third party, thereby increasing the stability and security of the whole operations. Further, in at least some embodiments, the techniques do not require the users to enter any information, thereby preventing leakage of the user information. The techniques thus also reduce transmission of messages to establish SNS relationship, avoid generation of massive amount of useless messages to establish SNS relationship due to errors of determination, and reduce the burden of the device that sends out the messages to establish SNS relationship. Certainly, it is not necessary for any embodiment of the present disclosure to achieve all of the advantages at the same time.

Second Example Embodiment

The above example embodiment provides the method for establishing SNS relationship. The description below provides detailed descriptions of the method for establishing SNS relationship by reference to specific application scenarios.

In one application scenario, a priority of the direct payment record information, the substitute payment record information, or the joint payment record information contained in the online payment information may be set up. The obtained direct payment record information, substitute payment record information, and joint payment record information of the first user and second user, together with the corresponding priority, may be used to establish SNS relationship.

Figure 2:
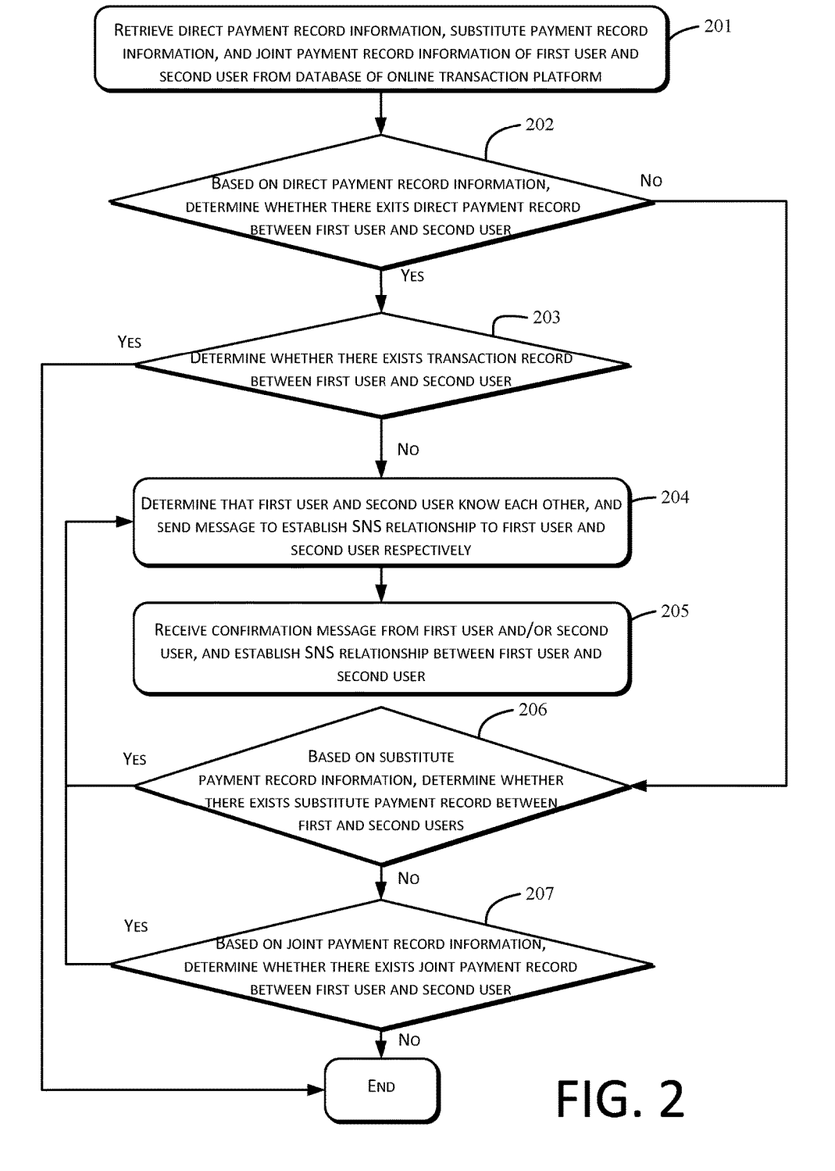
FIG. 2 shows an exemplary flow diagram of a method for establishing SNS relationship under a second example embodiment of the present disclosure.

FIG. 2 shows a second example process for establishing SNS relationship using online payment information where a priority of the type of payment information is provided. In this example, direct payment record information is prioritized higher than that of the substitute payment record information, and the priority of the substitute payment record information is higher than that of the joint payment record information. The process is shown as a series of blocks that represent operations as below. These operations may be performed programmatically, for example, in software and/or hardware.

At 201, the direct payment record information, the substitute payment record information, and the joint payment record information of the first user and the second user are retrieved from the database of the online transaction platform.

The direct payment record information may include a direct payor, a direct payee, and a payment amount. The direct payment record information of the first user may include direct payment record information of the direct payor who is identified as the first user. The direct payment record information of the second user may include direct payment record information of the direct payor who is identified as the second user. In addition, the direct payment record information of the first user may include direct payment record information of the direct payee who is identified as the first user. The direct payment record information of the second user may include direct payment record information of the direct payee who is identified as the second user.

The substitute payment record information may include a payor who directly pays a substitute payment amount, a payor who is responsible for the substitute payment amount, and the substitute payment amount. The direct payment record information of the first user may include direct payment record information of the payor who directly pays the substitute payment amount and is identified as the first user. The direct payment record information of the second user may include direct payment record information of the payor who directly pays the substitute payment amount and is identified as the second user. In addition, the direct payment record information of the first user may include direct payment record information of the payor who is responsible for the substitute payment amount and is identified as the first user. The direct payment record information of the second user may include direct payment record information of the payor who is responsible for the substitute payment amount and is identified as the second user.

The joint payment record information may include the first payor and a corresponding first payment amount and the second payor and a corresponding second payment amount, and may also include one or more payors other than the first payor and the second payor and their corresponding payment amounts. The joint payment record information of the first user may include the joint payment record information in which the first user participates in the joint payment. The joint payment record information of the second user may include the joint payment record information in which the second user participates in the joint payment.

At 202, based on the direct payment record information, a determination is made as to whether there exits the direct payment record between the first user and the second user. If a determination result is yes, the operation at 203 is performed. If the determination result is no, the operation at 206 is performed.

Specifically, when the direct payment record information of the first user is the direct payment record information of the direct payor who is identified as the first user, and the direct payment record information of the second user is the direct payment record information of the direct payor who is identified as the second user, if the direct payment record information of the first user includes the second user as the direct payee, and/or the direct payment record information of the second user includes the first user as the direct payee, then there exists the direct payment record between the first user and second user.

In addition, when the direct payment record information of the first user is the direct payment record information of the direct payee who is identified as the first user, and the direct payment record information of the second user is the direct payment record information of the direct payee who is identified as the second user, if the direct payment record information of the first user includes the second user as the direct payor, and/or the direct payment record information of the second user includes the first user as the direct payor, then there exists the direct payment record between the first user and second user.

At 203, a determination is made as to whether there exists the transaction record between the first user and the second user. If a determination result is yes, then the operations of the process are terminated. If the determination result is no, then an operation at 204 is performed.

Specifically, when there exists the direct payment record between the first user and the second user, and there also exists the transaction record between the first user and second user, the purpose of the direct payment record is to complete the transaction and is thus a normal payment record and it is uncertain whether the first user and the second user know each other in the real world. If there does not exist the transaction record between the first user and the second user, the purpose of the direct payment record is not to complete the transaction, which may be used to determine whether the first user and the second user knows each other in the real world.

For example, if the first user makes direct payments to the second user, and purchases a product sold by the second user online, such payment is the normal transaction activity, and cannot be used to determine whether the first user and the second user knows each other in the real world. In contrast, if the first user makes payments to the second user, but does not purchase the product sold by the second user online, then such payment is not the normal transaction activity, and may be used to determine that the first user and the second user know each other in the real world. Such techniques may effectively increase successful rate to establish the SNS relationship, reduce transmission of messages to establish SNS relationship, avoid generation of massive amount of useless messages to establish SNS relationship due to errors of determination, and reduce the burden of the device that sends out the messages to establish SNS relationship.

At 204, a determination is made as to whether the first user and the second user know each other. If a determination result is positive, the message to establish SNS relationship is sent to the first user and the second user respectively.

The message, sent to the first user, to establish the SNS relationship may contain the personal information of the second user. The message, sent to the second user, to establish the SNS relationship may contain the personal information of the first user.

At 205, a confirmation message is received from the first user and/or the second user, and the SNS relationship is established between the first user and the second user.

Specifically, after the message to establish SNS relationship has been sent to the first user and second user, the first user and the second user may decide whether to establish SNS relationship with the other party by clicking a confirmation or cancelation button. For example, after the first user and the second user receive the message to establish SNS relationship, if one of them clicks the confirmation button and sends the confirmation message, the SNS relationship between the first user and the second user is established; if both users click the cancellation button, then the SNS relationship is not established.

It is noted that the operation at 206 is not performed after the operation at 205.

At 206, a determination is made as to whether there exists the substitute payment record between the first user and the second user based on the substitute payment record information. If a determination result is yes, then an operation at 204 is performed. If the determination result is no, then an operation at 207 is performed.

Specifically, when the substitute payment record information of the first user is the substitute payment record information of the payor who directly pays the substitute payment amount and is identified as the first user, and the substitute payment record information of the second user is the substitute payment record information of the payor who directly pays the substitute payment amount and is identified as the second user, if the substitute payment record information of the first user includes the second user as the payor who is responsible for the substitute payment amount, and/or the substitute payment record information of the second user includes the first user as the payor who is responsible for the substitute payment amount, then there exists the substitute payment record between the first user and the second user, which may be used to determine that the first user and the second user know each other in the real world.

When the substitute payment record information of the first user is the substitute payment record information of the payor who is responsible for the substitute payment amount and is identified as the first user, and the substitute payment record information of the second user is the substitute payment record information of the payor who is responsible for the substitute payment amount and is identified as the second user, if the substitute payment record information of the first user includes the second user as the payor who directly pays the substitute payment amount, and/or the substitute payment record information of the second user includes the first user as the payor who directly pays the substitute payment amount, then there exists the substitute payment record between the first user and second user, which may be used to determine that the first user and the second user know each other in the real world.

At 207, a determination is made as to whether there exists the joint payment record between the first user and the second user based on the joint payment record information. If a determination result is yes, then an operation at 204 is performed. If the determination result is no, then the operations of the process are terminated.

Specifically, when the joint payment record information of the first user includes the second user as one of the joint payors, and/or the joint payment record information of the second user includes the first user as one of the joint payors, a determination is made that there exits the joint payment record between the first user and second user, which may be used to determine that the first user and the second user know each other in the real world.

The present disclosure includes at least following advantages. When determining, based on the online payment information, that two users know each other, the techniques send to one user the message to establish SNS relationship that contains the personal information of the other user, in order to establish SNS relationship. In the process, the techniques may determine that the two users who know each other are both members of the SNS community, thereby increasing the successful rate of establishing SNS relationship. In addition, the above confirmation process is based on the platform and database of SNS without reliance on any third party, thereby increasing the stability and security of the whole operations. Further, in at least some embodiments, the techniques do not require the users to enter any information, thereby preventing leakage of the user information. The techniques thus also reduce transmission of messages to establish SNS relationship, avoid generation of massive amount of useless messages to establish SNS relationship due to errors of determination, and reduce the burden of the device that sends out the messages to establish SNS relationship. Certainly, it is not necessary for any embodiment of the present disclosure to achieve all of the advantages at the same time.

Third Example Embodiment

Figure 3:
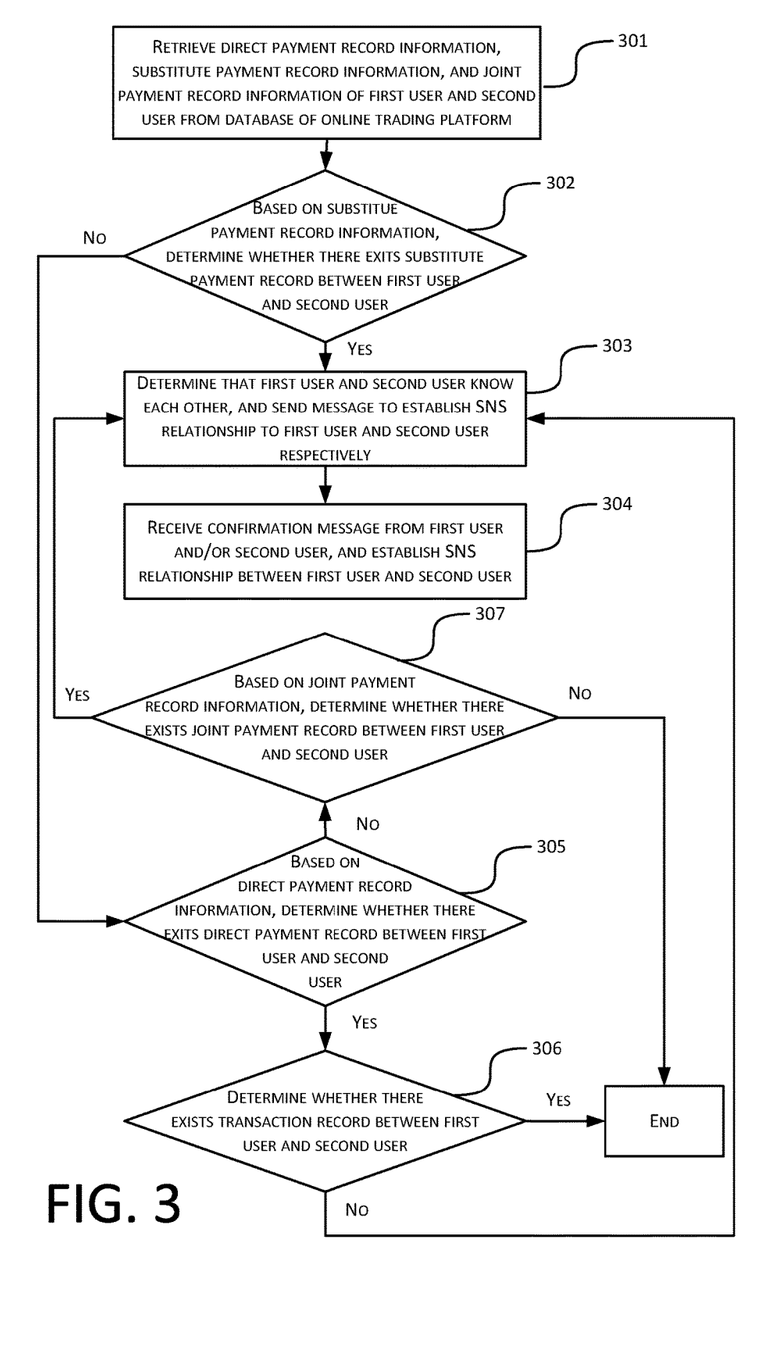
FIG. 3 shows an exemplary flow diagram of a method for establishing SNS relationship under a third example embodiment of the present disclosure.

FIG. 3 shows a third example process for establishing SNS relationship using online payment information where again a priority of the type of payment information is provided. In this case, the priority of the substitute payment record information is higher than that of the direct payment record information, and the priority of the direct payment record information is higher than that of the joint payment record information. The process is shown as a series of blocks that represent operations. These operations may be performed programmatically, for example, in software and/or hardware.

At 301, the direct payment record information, the substitute payment record information, and the joint payment record information of the first user and the second user are retrieved from the database of the online transaction platform.

At 302, based on the substitute payment record information, a determination is made as to whether there exits the substitute payment records between the first user and the second user. If a determination result is yes, an operation at 303 is performed. If the determination result is no, then an operation at 305 is performed.

At 303, a determination is made that the first user and the second user know each other in the real world, and the message to establish SNS relationship is sent to the first user and second user respectively.

At 304, a confirmation message is received from the first user and/or the second user, and the SNS relationship is established between the first user and the second user.

It is noted that the operation at 305 is not performed after an operation at 304.

At 305, a determination is made as to whether there exists the direct payment record between the first user and the second user. If a determination result is yes, then an operation at 306 is performed. If the determination result is no, then an operation at 307 is performed.

At 306, a determination is made as to whether there exists the transaction record between the first user and the second user. If a determination result is yes, then the operations are terminated. If the determination result is no, then the operation at 303 is performed.

At 307, based on the joint payment record information, a determination is made as to whether there exists the joint payment record between the first user and the second user. If a determination result is yes, then the operation at 303 is performed. If the determination result is no, then the operations are terminated.

Fourth Example Embodiment

Figure 4:
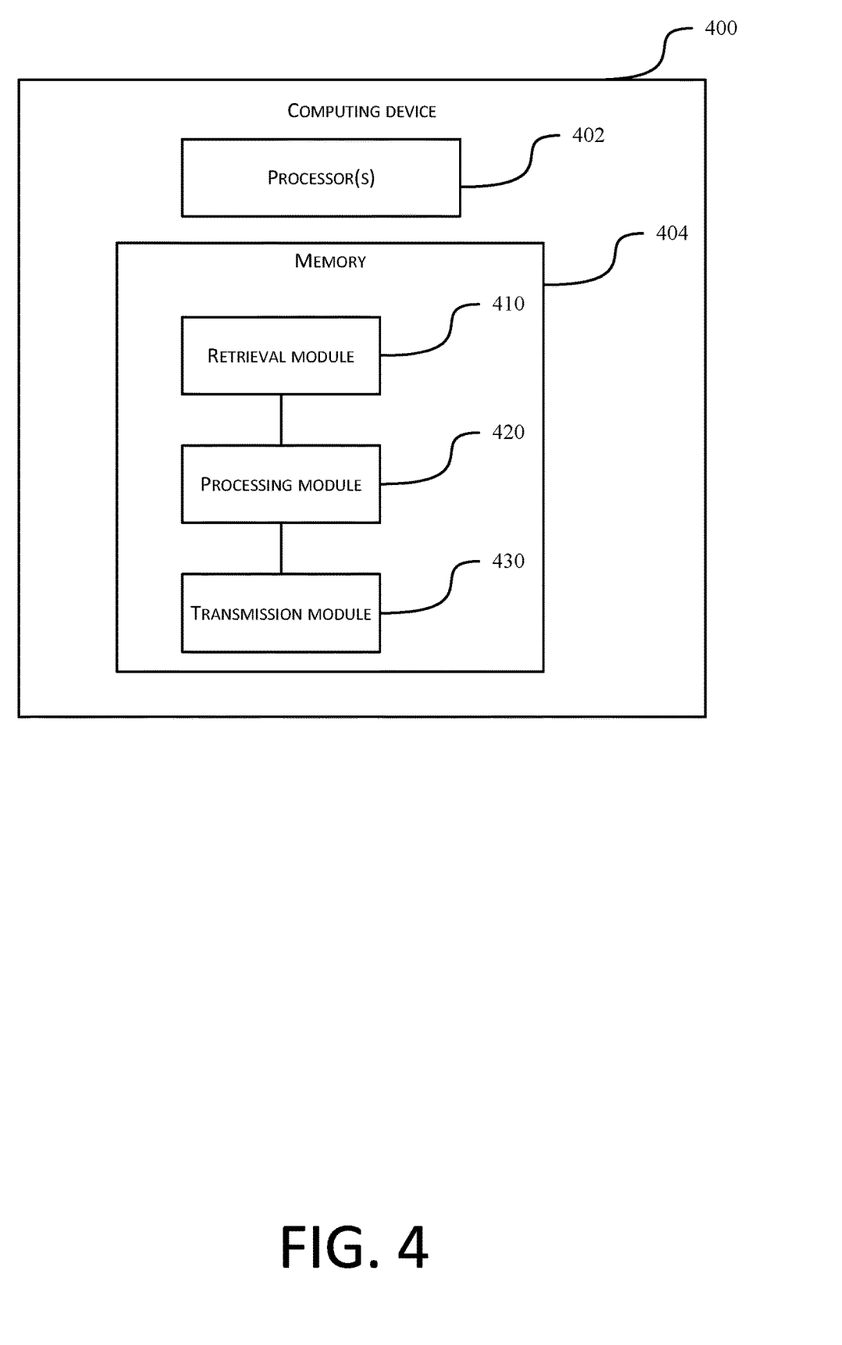
FIG. 4 shows a schematic diagram of a device for establishing SNS relationship under a fourth example embodiment of the present disclosure.

FIG. 4 illustrates an example computing device 400 for establishing the SNS relationship under the fourth example embodiment of the present disclosure. In one embodiment, the computing device 400 can include, but is not limited to, one or more processors 402 and memory 404. The memory 404 may include computer-readable media in the form of volatile memory, such as random-access memory (RAM) and/or non-volatile memory, such as read only memory (ROM) or flash RAM. The memory 404 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 404 may store therein program units or modules and program data. In one embodiment, the modules may include a retrieval module 410, a processing module 420, and a transmission module 430. These modules may therefore be implemented in software that can be executed by the one or more processors 402. In other implementations, the modules may be implemented in firmware and/or hardware.

The retrieval module 410 retrieves the online payment information of the first user and/or the second user from the database of the online transaction platform. The online payment information of the first user and/or the second user may be stored at a device with high security, and, in one example, may be stored at the database of the same online transaction platform.

Specifically, the retrieval module 410 is used to retrieve from the database of the online transaction platform at least one of following items of the first user and/or the second user: the direct payment record information, the substitute payment record information, and the joint payment record information.

The processing module 420 determines that the first user and the second user know each other based on the online payment information retrieved by the retrieval module 410.

The transmission module 430 transmits the message to establish SNS relationship to the first user after the processing module 420 determines that the first user and the second user know each other. The message to establish SNS relationship, sent to the first user, includes personal information of the second user.

In addition, the transmission module 430 may also transmit the message to establish SNS relationship to the second user after the processing module 420 determines that the first user and the second user know each other. The message to establish SNS relationship, sent to the second user, includes personal information of the first user.

Specifically, if determining that there exists the direct payment record between the first user and the second user and there does not exist the transaction record between the first user and second user, the processing module 420 determines that the first user and the second user know each other.

Specifically, if determining that there exists the substitute payment record between the first user and the second user, the processing module 420 determines that the first user and the second user know each other.

Specifically, if determining that there exists the joint payment record between the first user and the second user, the processing module 420 determines that the first user and the second user know each other.

Specifically, when setting priority for each of the direct payment record information, the substitute payment record information and the joint payment record information contained in the online payment information, the processing module 420 may, based on the priority and corresponding online payment information, determine whether the first user and the second user know each other.

Specifically, when the set priority of the direct payment record information is higher than that of the substitute payment record information, and the set priority of the substitute payment record information is higher than that of the joint payment record information, the processing module 420 determines whether the first user and the second user know each other as follows. The processing module 420, based on the direct payment record information, may determine that there exists the direct payment record between the first user and the second user, and further determine that the first user and second user know each other if there does not exist the transaction record between the first user and second user.

When there does not exist the direct payment record between the first user and the second user, but there exists the substitute payment record between the first user and second user based on the substitute payment information, the processing module 420 may determine that the first user and the second user know each other.

When there does not exist the direct payment record and substitute payment record between the first user and the second user, but there exists the joint payment record between the first user and second user based on the joint payment information, the processing module 420 determines that the first user and the second user know each other.

The present disclosure includes at least following advantages. When determining, based on the online payment information, that two users know each other, the techniques send to one user the message to establish SNS relationship that contains the personal information of the other user, in order to establish SNS relationship. In the process, the techniques may determine that the two users who know each other are both members of the SNS community, thereby increasing the successful rate of establishing SNS relationship. In addition, the above confirmation process is based on the platform and database of SNS without reliance on any third party, thereby increasing the stability and security of the whole operations. Further, in at least some embodiments, the techniques do not require the users to enter any information, thereby preventing leakage of the user information. The techniques thus also reduce transmission of messages to establish SNS relationship, avoid generation of massive amount of useless messages to establish SNS relationship due to errors of determination, and reduce the burden of the device that sends out the messages to establish SNS relationship. Certainly, it is not necessary for any embodiment of the present disclosure to achieve all of the advantages at the same time.

Through the above descriptions of the example embodiments, a person of ordinary skill in the art can clearly understand that the present disclosure may be implemented using software together with necessary general purpose used hardware platform, or using only hardware. Based on this understanding, the essence of the techniques or the contributions to current technologies under the present disclosure may be implemented in the form of software products. Such software product may be stored in one or more computer storage media and include one or more computer-readable instructions to request an end device (such as a cell phone, a personal computer, a server, or a network device) to implement methods under the present disclosure.

The above descriptions are example embodiments of the present disclosure. It is worth noting that a person of ordinary skill in the art, without deviation from the principles of the present disclosure, may make further improvements or modifications. Such improvements and modification shall be considered as falling within the protection scope of the present disclosure.

A person of ordinary skill in the art may understand that the modules in the present disclosure may be distributed in the device as described in the embodiments, or may be modified to locate at one or more devices different from those described in the present disclosure. The modules of the above embodiments may be integrated into one entity, or be deployed separately. Such modules may be combined into one module, or be divided into multiple child modules. The order of the above-mentioned example embodiments is only for description purposes without representing preferences between them.

The above descriptions present only a few detailed example embodiments of the present disclosure. However, the present disclosure is not limited by these examples, and any changes conceived by one of ordinary skill in the art may fall under the protection of the present disclosure.

What is claimed is:

1. A method, performed by one or more processors configured with computer-executable instructions, the method comprising:

retrieving online payment information of a first user, a second user, or both, the online payment information including joint payment information;

determining that the first user and the second user know each other based on the online payment information, the determining including determining that a joint payment record between the first user and the second user exists based on the joint payment information, the joint payment information indicating that the first user and the second user jointly pay a third party;

sending a message to establish a social network service (SNS) relationship to a computing device of the first user, the message to establish the SNS relationship including personal information of the second user; and sending, by the computing device of the first user, a confirmation message for establishing the SNS relationship with the second user or sending, by the computer device of the first user, a cancellation message to stop the SNS relationship from establishing.

2. The method as recited in claim 1, wherein the retrieving the online payment information of the first user, the second user, or both includes retrieving the online payment information of the first user, the second user, or both from a database of an online transaction platform.

3. The method as recited in claim 1, further comprising:
receiving the confirmation message from the computing device of the first user; and
establishing the SNS relationship between the first user and the second user.

4. The method as recited in claim 3, further comprising recording the SNS relationship in a database.

5. The method as recited in claim 1, wherein the online payment information further includes direct payment record information or substitute payment record information.

6. The method as recited in claim 1, further comprises after determining that the first user and the second user know each other, sending a second message to establish the SNS relationship to a second computing device of the second user, the second message to establish the SNS relationship including personal information of the first user.

7. A method, performed by one or more processors configured with computer-executable instructions, the method comprising:

retrieving online payment information of a first user, a second user, or both, the online payment information including substitute payment record information;

determining that the first user and the second user know each other based on the online payment information, the determining including determining that there exists a substitute payment record between the first user and the second user based on the substitute payment record information, and the substitute payment record information including one user making a substitute payment for another user;

sending a message to establish a social network service (SNS) relationship to a computing device of the first user, the first message to establish the SNS relationship including personal information of the second user; and sending, by the computing device of the first user, a confirmation message for establishing the SNS relationship with the second user or sending, by the computer device of the first user, a cancellation message to stop the SNS relationship from establishing.

8. The method as recited in claim 7, wherein the substitute payment record information indicates that the first user pays a substitute payment for the second user, or that the second user pays the substitute payment for the first user.

9. The method as recited in claim 7, wherein the retrieving the online payment information of the first user, the second user, or both includes retrieving the online payment information of the first user, the second user, or both from a database of an online transaction platform.

10. The method as recited in claim 7, further comprising:
receiving the confirmation message from the computing device of the first user; and
establishing the SNS relationship between the first user and the second user.

11. The method as recited in claim 10, further comprising recording the SNS relationship in a database.

12. The method as recited in claim 7, wherein the online payment information further includes direct payment record information or joint payment record information.

13. The method as recited in claim 7, further comprises after determining that the first user and the second user know each other, sending a second message to establish the SNS relationship to a second computing device of the second user, the second message to establish the SNS relationship including personal information of the first user.

14. A method, performed by one or more processors configured with computer-executable instructions, the method comprising:

retrieving online payment information of a first user, a second user, or both, the online payment information including direct payment record information and substitute payment record information;

determining that the first user and the second user know each other based on the online payment information in response to determining that there does not exists a direct payment record between the first user and the second user and determining that there exists a substitute payment record between the first user and the second user based on the substitute payment record information, the substitute payment record information including one user making a substitute payment for another user; and sending a message to establish a social network service (SNS) relationship to a computing device of the first user, the message to establish the SNS relationship including personal information of the second user; and sending, by the computing device of the first user, a confirmation message for establishing the SNS relationship with the second user or sending, by the computer device of the first user, a cancellation message to stop the SNS relationship from establishing.

15. The method as recited in claim 14, wherein the retrieving the online payment information of the first user, the second user, or both includes retrieving the online payment information of the first user, the second user, or both from a database of an online transaction platform.

16. The method as recited in claim 14, further comprising:
   receiving the confirmation message from the computing device of the first user; and
   establishing the SNS relationship between the first user and the second user.

17. The method as recited in claim 16, further comprising recording the SNS relationship in a database.

18. The method as recited in claim 14, wherein the online payment information further includes joint payment record information.

19. The method as recited in claim 14, further comprises after determining that the first user and the second user know each other, sending a second message to establish the SNS relationship to a second computing device of the second user, the second message to establish the SNS relationship including personal information of the first user.

\* \* \* \* \*